United States Patent [19]
Shaffer et al.

[11] Patent Number: 5,995,490
[45] Date of Patent: Nov. 30, 1999

[54] METHOD AND SYSTEM FOR INTEGRATING VIDEO AND DATA TRANSFERS IN A MULTIMEDIA SESSION

[75] Inventors: Shmuel Shaffer, Palo Alto; William J. Beyda, Cupertino, both of Calif.

[73] Assignee: Siemens Information and Communication Networks, Inc., Boca Raton, Fla.

[21] Appl. No.: 08/766,272

[22] Filed: Dec. 13, 1996

[51] Int. Cl.[6] .............................. H04N 7/15; H04L 12/18; H04M 3/56

[52] U.S. Cl. ...................... 370/260; 370/230; 370/468; 370/477; 370/263; 348/15; 379/908; 379/93.21; 379/204

[58] Field of Search ................................. 370/260, 230, 370/253, 468, 493, 477, 259, 261, 263, 271, 270; 348/17, 15, 14, 13; 379/93.08, 202, 908, 93.21, 100.01, 201, 90.01, 93.01, 204, 93.17; 345/327, 384, 390, 423

[56] References Cited

U.S. PATENT DOCUMENTS

| | | | |
|---|---|---|---|
| 5,341,374 | 8/1994 | Lewen et al. | 370/85.4 |
| 5,373,316 | 12/1994 | Ishinabe et al. | 348/15 |
| 5,392,223 | 2/1995 | Caci | 348/17 X |
| 5,502,727 | 3/1996 | Catanzaro et al. | 370/94.2 |
| 5,509,009 | 4/1996 | Laycock et al. | 370/259 |
| 5,526,350 | 6/1996 | Gittins et al. | 370/468 |
| 5,611,038 | 3/1997 | Shaw et al. | 345/327 X |
| 5,674,003 | 10/1997 | Andersen et al. | 348/15 X |
| 5,694,390 | 12/1997 | Yamato et al. | 370/230 |
| 5,801,757 | 9/1998 | Saulsbury | 348/17 |
| 5,812,545 | 9/1998 | Liebowitz et al. | 370/468 X |

*Primary Examiner*—Michael Horabik
*Assistant Examiner*—William H Wilson, Jr.

[57] ABSTRACT

A method and system for integrating occasional user-initiated data transfers with a generally continuous video transmission in a multimedia communications session includes enabling a party of the session to select at least two levels of video quality of service for the session. A first level is selected for time segments in which the user-initiated data transfers are active. A second level of video QoS is selected for time segments having user-initiated data transfers. Connectivity for the session is established based upon the first level. However, upon initiation of a data transfer, the video transmission requirements are switched to requirements based upon the second level of video quality of service. Present-time quality of service is monitored to determine whether the data transfer should be regulated so as to ensure that the present-time video quality of service remains at or above the second selected level. The method and system allow a user to determine what level, if any, of degradation is permissible during the data transfers.

17 Claims, 2 Drawing Sheets

METHOD AND SYSTEM FOR INTEGRATING VIDEO AND DATA TRANSFERS IN A MULTIMEDIA SESSION

BACKGROUND OF THE INVENTION

The invention relates generally to methods and systems for providing multimedia communications, such as a video conference call, and more particularly to methods and systems for integrating user-initiated data transfers into real-time video transmissions.

DESCRIPTION OF THE RELATED ART

There are a number of applications in which occasional and user-initiated data transfers must be integrated with a generally continuous transmission of video information. For example, in a video conference involving two or more telecommunications stations, one of the users may initiate a file transfer. in such "whiteboarding" application, a textual document or illustration or still image may be transferred from one video conference station to another station. The occasional data transfer and the real-time video transmission may use separate channels, but it is more economical to utilize a single channel by integrating the data and video transfers. However, the transmission of a data file often causes the video transmission to be interrupted, essentially "freezing" a digital image at the receiving station.

In order to reduce the bandwidth requirements for multimedia communication sessions, the video transmissions are digitized and compressed. Encoded signals are then multiplexed into a single bit stream for transmission through network to remote system. The single bit stream may include the video information, audio information and the occasional user-initiated data transfer. For example, in an asynchronous transfer mode (ATM) environment, fixed-size cells of relatively short length are transmitted using cell-based switching and multiplexing technology. An ATM cell, or packet, has a length of 53 bytes, with 5 bytes being used as a header and the remaining 48 bytes comprising some transmission overhead and the payload. While ATM is designed for switching cells in hardware over high speed links, real-time video transmissions for video conferences tax this end-to-end throughput capability. Consequently, the occasional user-initiated data transfers often necessarily affect the video quality of service.

The video quality of service may be defined as being a unction of a single parameter or more than one parameter. The throughput of the video transmissions affects video quality of service, since throughput determines the frames per second available for display at the receiving station. Another parameter is data loss. Within an ATM environment, the loss of 53-byte cells adversely affects the quality of service. Another parameter of concern is time delay, sometimes referred to as "latency." Again referring to the ATM environment, latency is a measure of the time required for a cell to reach a receiving station. A related parameter is "jitter," which is the variation in latency for different cells.

U.S. Pat. No. 5,341,374 to Lewen et al. describes a local area network (LAN) that integrates different types of information (e.g., voice, data and image information) over a single cable. Conflicts in demand for the bandwidth of the cable are resolved by providing the voice packets with the highest priority. Moreover, the non-voice packet length is related to the fixed voice packet length, thereby ensuring real-time voice reception. By providing a hierarchy of types of information, the LAN allows the parties to remain in constant voice communication. While the Lewen et al. network provides advantages over prior art systems, the concern is that the prioritization of voice communication may not be preferred, or even acceptable to all users of the network, or may not be appropriate to all communications sessions conducted over the network. For example, if the parties of a conference call require the transmission of a chart from one station to the other stations of the call, the parties may need to cease conversation in order to allow efficient transmission of the chart data.

Moreover, within video conferences, video transmission and audio transmission are equally important, so that lip synchronization can be achieved at the receiving stations. Consequently, assigning a higher priority to the voice information is not desirable.

What is needed is a method and system for integrating user-initiated data transfers with generally continuous video transmissions in a multimedia communication session, with the integration occurring in a configurable manner.

SUMMARY OF THE INVENTION

A method and system for integrating a user-initiated data transfer, such as a designated data file, with a generally continuous video transmission in a multimedia communication session includes enabling a party of a session to select at least two different levels of video quality of service for the session. A first level of video quality of service is selected for those times in which no data transfers occur. A second level of video quality of service is selected for time segments during the data transfers. Typically, the first level exceeds the second level, so that the party determines degradation of video quality of service during the data transfers.

After the party has selected the first and second levels of video quality of service (QoS), connectivity is negotiated for the session. The negotiation occurs using known techniques, with the higher level of video QoS being used as the basis for selecting the connectivity. When a party initiates a first user-initiated data transfer, the video transmission requirements are switched based upon the selected second level of video QoS. In this mode of operation, the video transmissions may be degraded, but remain above the level indicated to be acceptable by the parties of the session. Following the user-initiated data transfer, the first level of video QoS is restored.

In one embodiment, the step of switching the video transmission requirements during the user-initiated data transfer is implemented by monitoring the video QoS and controlling transmissions for the data transfer in response to detecting that the monitored video QoS is below a threshold quality. Controlling the transmissions of the video transfers may be an interruption of the data transfers until the bit rate of video transmissions exceeds a threshold, again determined by the selection of the second level of QoS. Alternatively, in a packet-switching environment, such as ATM, controlling the transmissions of the video transfers may be implemented by increasing the ratio of video packet-to-data packet until the second level of QoS is reached.

In the system embodiment, each of the remote sites includes video equipment and file transfer equipment for exchanging video data and data files. Equipment for enabling the user to select the first and second levels of video QoS is provided. At least one of the stations includes a monitoring device for determining the present-time video QoS during the data transfers. A regulator is responsive to the monitoring device to control the rates of exchanges of the file transfers in order to maintain at least the second level of video QoS during the file transfers. The regulator is typically disabled between file transfers.

DETAILED DESCRIPTION

Figure 1:
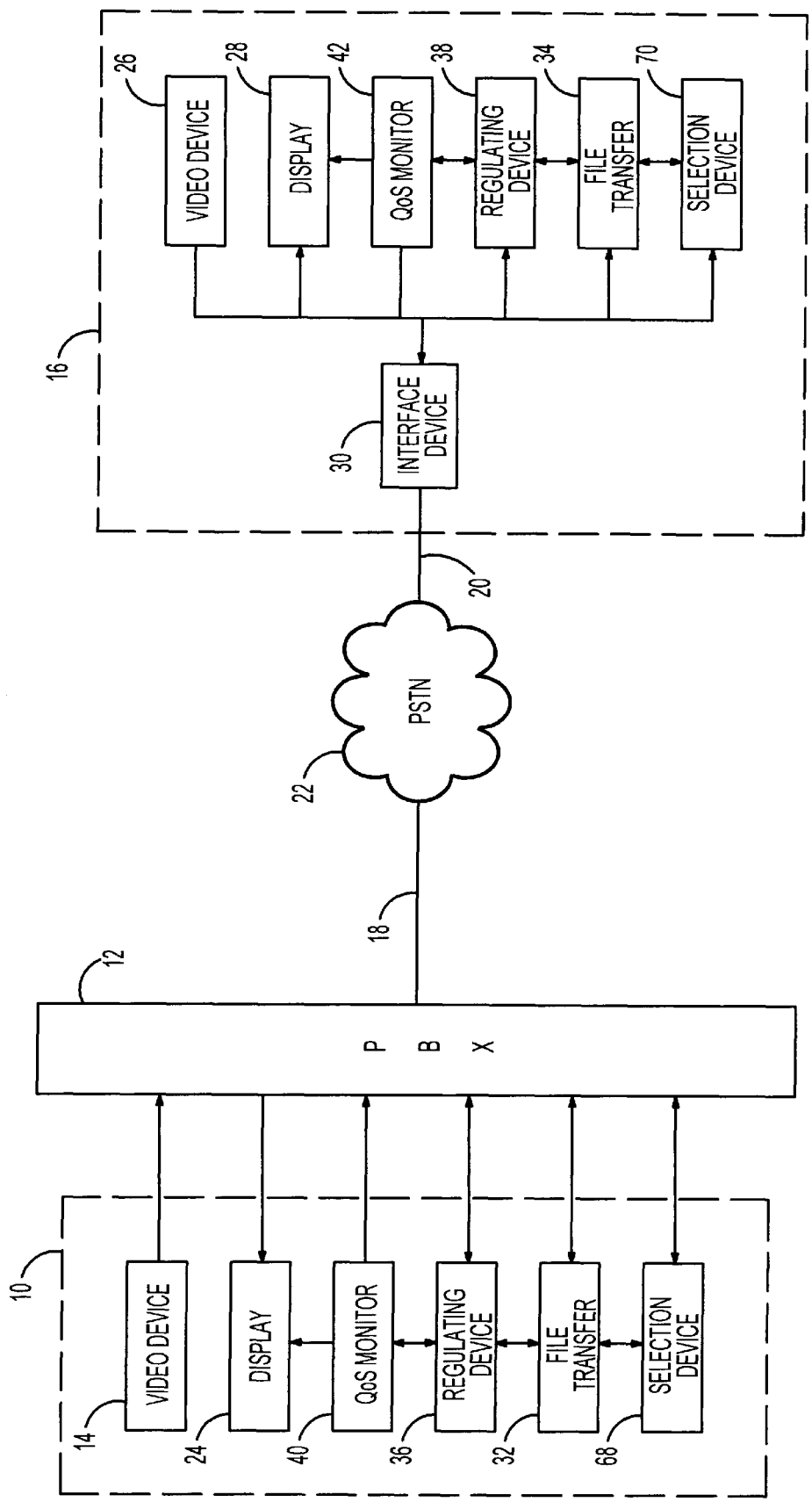
FIG. 1 is a block diagram of two multimedia-capable systems for integrating video transmissions and data transfers in accordance with the invention.

With reference to FIG. 1, a first multimedia-capable system 10 is shown as being supported by a private branch exchange (PBX) 12. In one embodiment, the system 10 is a teleconferencing station, such as a personal computer having video and audio capability, or a larger system dedicated to teleconferencing.

The multimedia-capable system 10 includes a video device 14. The video device may be a camera that transmits video information to the PBX 12. While not critical, the video information is preferably encoded and compressed, so that it may be more efficiently transferred to a second multimedia-capable system 16 via one or more links 18 and 20 of a public switched telephone network (PSTN) 22. For example, the link 18 may be a leased line dedicated to the PBX. The physical connectivity of the first and second systems 10 and 16 is not critical to the invention. The system and method apply equally to two PBX-supported stations and to two stations for which neither is supported by a PBX.

In one embodiment, the video transmissions from the device 14 of the first system 10 to the remote system 16 utilizes the fixed-size cells of ATM technology. In this exemplary embodiment, the cells have a fixed length of 53 bytes, with 5 bytes being a header and the remaining 48 bytes containing some transmission overhead and the payload. The payload is the video transmission, but also includes occasional user-initiated data transfers, as will be explained more fully below. The payload may also include audio information. The cells are transmitted from the sending system 10 to the remote system 16 using a digital link 18, such as an integrated services digital network (ISDN) line.

The PBX-supported system 10 also includes a display 24. The display may be a computer monitor or other device for forming an image responsive to a received video transmission. The display may be used to form an image of activity transmitted from a video device 26 of the remote system 16. The remote system also includes a display 28 for forming an image responsive to the video transmissions from the PBX-supported system 10. The video devices and the displays of the two systems 10 and 16 need not be identical. An interface device 30 at the remote station 16 is selected to provide compatibility with respect to the exchange of transmissions between the two systems.

While not shown, the two systems 10 and 16 are preferably capable of exchanging audio information. For example, a microphone may be connected at each of the systems for generating audio information that is lip-synched to the video transmissions. The synchronized transmission of video and audio information is well known in the art and is not critical to the invention.

In addition to video and audio transmissions, the systems 10 and 16 include devices for the exchange of user-initiated data transfers. The file transfer devices 32 and 34 may be facsimile machines. A video conference station having facsimile capability is described in U.S. Pat. No. 5,373,316 to Ishinabe et al. Within the Ishinabe et al. system, a commercially available facsimile unit is connected to the same multiplexing/demultiplexing unit as a video device. The multiplexing/demultiplexing unit multiplexes a facsimile signal with a video/voice signal and demultiplexes a received signal into a facsimile signal and a video/voice signal. However, the system is not designed to preserve the video quality of service in the manner to be described below.

Rather than a facsimile machine, the file transfer devices 32 and 34 may be scanners that form a digital image of a document or photograph that is to be discussed by the parties of a teleconference or other multimedia communications session. The bitmap data are transmitted with the video transmissions via the links 18 and 20. Yet another alternative is to utilize cameras for transmitting still images in combination with the real-time video information from the video devices 14 and 26. The file transfer devices may be any device that allows a party of the communications session to initiate transfer of a data file. While each of the systems 10 and 16 is shown as including only one file transfer device, multiple devices may be contained within each of the systems.

Each of the multimedia-capable systems 10 and 16 also includes a regulating device 36 and 38 that is used to control execution of the file transfer from the file transfer devices 32 and 34. A regulating device either directly controls the file transfer device of the same system or controls data transfers from the remote system. The regulation is based upon video quality of service (QoS). That is, during a user-initiated data transfer using the file transfer devices 32 and 34, the regulating devices may be used to interrupt the data transfers or to reduce the rate of data transfer if the video QoS drops below a preselected level. QoS monitors 40 and 42 are used in the determination of whether the video QoS has degraded to a level in which regulation of data transfer must be implemented.

Figure 2:
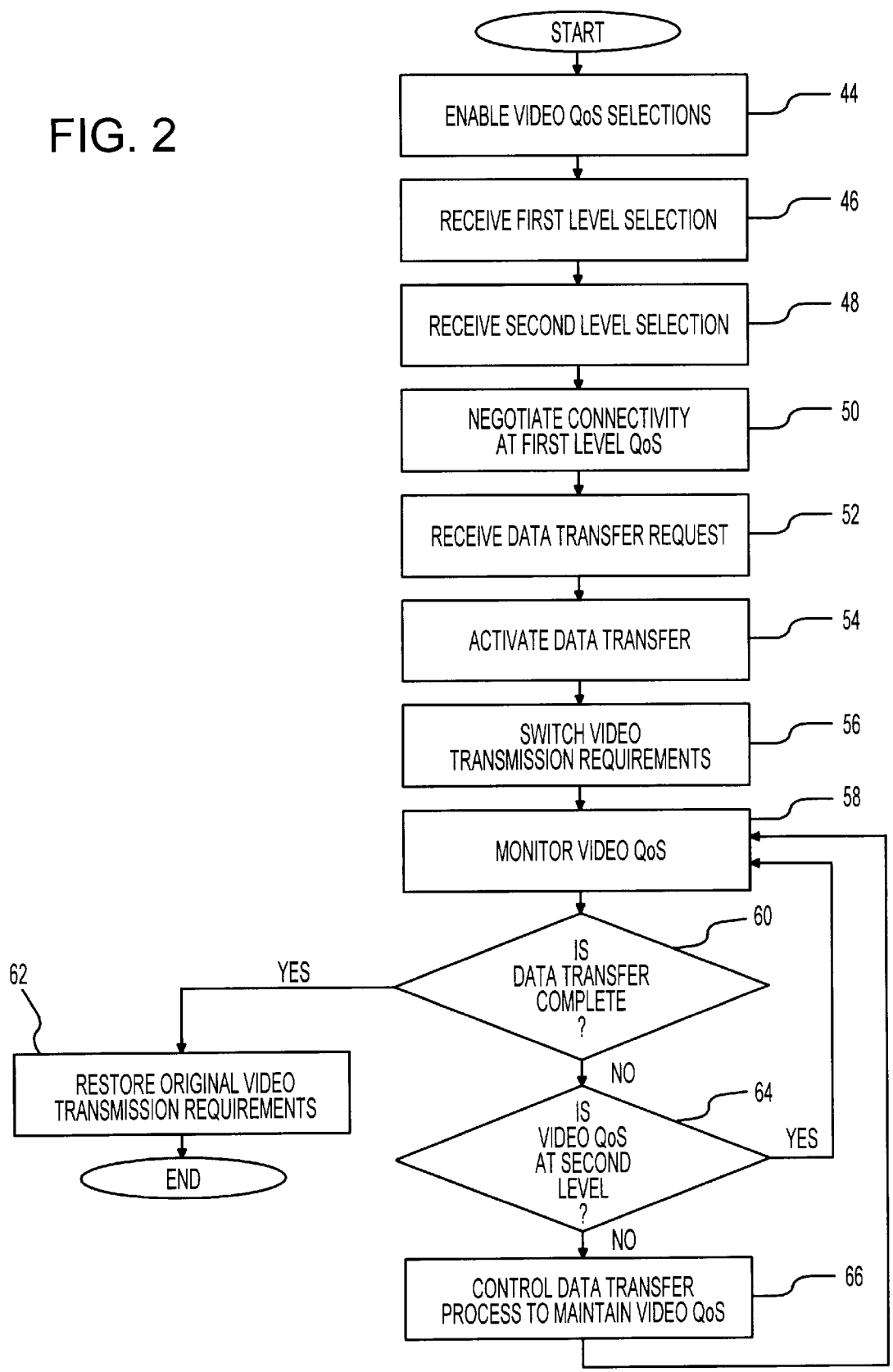
FIG. 2 is a process flow of steps for implementing a multilevel video quality of service control using the systems of FIG. 1.

Referring now to FIGS. 1 and 2, a multimedia communication session is initiated in the conventional manner, with the exception that the video QoS selection enables input of two levels, rather than a single level. The systems 10 and 16 include selection devices 68 and 70 to enable a user to select between the two levels of video QoS. The step 44 of enabling video QoS selections is followed by steps 46 and 48 of receiving a designated first QoS level and a designated second QoS level. The first level is typically, but not necessarily, higher than the second level, since the first level applies to times in which no user-initiated data transfer occurs. Thus, the video transmissions do not compete with the data transfers in utilizing the transmission capabilities of the communications systems. For example, if a single channel is to be used to transfer both the video transmissions and the data transfers, the video QoS can be at a higher level when the file transfer devices 32 and 34 are inactive. Allowing a user to determine the level of degradation of video QoS at step 48 permits a party input with respect to the prioritization of traffic through the channel.

The steps 46 and 48 of receiving the selected levels of video QoS may be implemented in a number of manners. For example, the first level may be a default level, so that the party selects only the second level. In a sophisticated embodiment, the systems 10 and 16 request specific parameter values, such as values related to the bit rate of video transmissions (e.g., a first level of 10 Mbps and a second value of 5 Mbps), packet loss values, delay values and/or jitter values. In a less sophisticated embodiment, the party is presented with relative selections, e.g., "high QoS,"

"medium QoS," and "low QoS." The systems are then able to determine the relevant QoS parameter values based upon a stored table or the like.

After the first and second levels of video QoS have been selected, conventional techniques are used to negotiate connectivity of the two or more systems 10 and 16 that are to participate in the multimedia communication session. As shown at step 50 in FIG. 2, the connectivity is negotiated to establish the first level of video QoS. If no party in the communications session initiates a data transfer during the session, the transmission requirements remain the same throughout the session. On the other hand, the initiation of a data transfer from one of the file transfer devices 32 and 34 to the other system results in the switching of the transmission requirements with regard to video QoS.

At step 52, a data transfer request is received. This step may be merely a manipulation of a switch by one of the parties to send a fax file, a still image, a computer file, or a scanner-generated bitmap. In step 54, the data transfer is activated. In an ATM environment, the cells having a payload that carries the data from a file transfer device 32 and 34 may be appropriately tagged with a cell header. That is, the sending system 10 and 16 may inject an appropriate header into the data transfer cells, so that the receiving system is able to distinguish between the video-containing cells and the data-containing cells. At the receiving system, the data-containing cells are separated from the video-containing cells and are typically transmitted to the receiving file transfer device 34. However, the received data transfers may be conducted to the video device 14 and 26 of the receiving system in some applications. The demultiplexing of the video-containing cells and data-containing cells is executed within the PBX 12 or the interface device 30, and is known in the art.

As previously noted, the video transmission requirements are switched upon activation of the data transfer 54. This switching step 56 is shown in FIG. 2 as occurring after the activation step 54. However, the switch of the video transmission requirements typically occurs either simultaneously with the data transfer activation or immediately preceding the activation. The video transmission requirements are based upon the selection of the second level of video QoS at step 48. While the second level of video QoS is often a degradation of the video, this is not critical. A party may select equivalent first and second levels, indicating that the video QoS should not be sacrificed to accommodate data transfers. The switch of video transmission requirements may be executed at the sending system 10 and 16, the receiving system, or a combination of the two. For applications in which the receiving station is to cooperate in the switching step, a control message is transmitted from the sending station to the receiving station in the same manner as conventional SETUP and other control messages.

While the video transmission requirements are switched at step 56 in response to a user-initiated data transfer of steps 52 and 54, the video transmissions are not necessarily affected. For situations in which video activity is low or the data transfer is minimal, the video QoS may remain at or above the first level of video QoS. Therefore, to determine whether the rate of data transfer should be regulated in order to maintain at least the second level of video QoS, a step 58 of monitoring present-time video QoS is included. In FIG. 1, each of the systems 10 and 16 includes a QoS monitor 40 and 42. The monitor device may utilize any of known techniques for determining present-time video quality of service parameter values. For example, received video-containing cells may be monitored for the time of arrival in order to determine the bit rate. In addition, the length of a buffer queue feeding to a video decoder may be analyzed. Of special interest is the case in which the buffer queue is empty as a result of a cell being lost or delayed through the network. The QoS monitor 40 and 42 collects statistical information about the jitter, delay, packet loss, and/or arrival rate by analyzing the time duration of the gap between cells in the decoder queue. However, other means of analyzing video QoS may be implemented without diverging from the invention.

During the step 58 of monitoring video QoS, a decision at step 60 is executed to determine whether the data transfer has been completed. If the transfer is complete, the original video transmission requirements are restored at step 62 and the monitoring process is terminated. Nevertheless, the process may return to step 52 if a second data transfer is initiated by one of the parties of the communications session.

If at the decision step 60 it is determined that the data transfer has not been completed, a decision is made at step 64 as to whether the present-time video QoS is at the second designated level of video QoS. For those situations in which the present-time video QoS is equivalent to the designated second level, the execution of the video transfer remains unaffected. That is, the method does not purposefully vary the process of transferring the data in order to enhance video quality of service. Rather, the method is looped back to the step 58 of monitoring the video quality of service.

On the other hand, if the present-time video QoS is below the second designated level as determined at step 64, the data transfer process is controlled at step 66 so as to return the present-time video QoS to the second designated level. If the step 66 of controlling data transfer is implemented at the transmitting system 10 and 16, the data transfer may be temporarily interrupted. In another embodiment, the control step 66 is implemented at the receiving system, requiring the receiving system to transmit a control message to the sending station. If a "suspend-until-restart-transfer" message may be sent to interrupt the data transfer until it is determined that a restart of the data transfer will not degrade the video QoS below the second designated level. For example, if the video updates are particularly high for some period of time, the data transfers may be suspended until the updates subside.

Interruption of a transfer may cause concerns with regard to time outs at higher levels of the data software. For example, where the data software has been configured to automatically terminate the data transfer upon determination that no transfer has occurred within a set period of time (e.g., five minutes), there is a concern that the time period will be exceeded during the suspension of data transfer at step 66. This concern may be alleviated by transmission of a control signal that increases the time out period at the higher layer of the data software.

As an alternative to suspending the data transfer to maintain the second designated level of video quality of service, the rate of the data transfer may be reduced at step 66. Again referring to the ATM environment, the reduction of the rate of the data transfer will increase the ratio of video-containing cells to data-containing cells. Consequently, the video QoS will increase. The decrease in the rate of the data transfer may be implemented by transmitting a control signal from one of the systems 10 and 16 to the other system.

After executing the step 66 of controlling the data transfer process, the procedure is looped back to the step 58 of monitoring present-time video QoS. If the data transfer is then completed, the decision step 60 directs the restoration of the original video transmission requirements at step 62. If the data transfer is not yet completed, a determination is made at 64 as to whether the updated video QoS is at the second designated level of video QoS. The revisit to the decision at step 64 may result in a determination that the present-time video QoS exceeds the second level. In this situation, the data transfer process is again controlled at step 66. The data transfer process may be restarted in those embodiments in which the control is a suspend-and-restart sequence, or the rate of the data transfer may be increased in embodiments in which the control is a slow down-and-speed up sequence. Again, if the control of the data transfer process is executed at a receiving station, control messages are exchanged between the two stations 10 and 16 as needed.

The step 58 of monitoring present-time video QoS is preferably continuous. The decision steps 60 and 64 and the control step 66 are executed in a loop fashion until the decision at step 60 is that the data transfer is complete, allowing the restoration of the original video transmission requirements at step 62. The QoS monitoring may then be disabled until a second user-initiated data transfer is activated at step 54.

An advantage of the method and system is that the user is allowed to determine the level of degradation of video QoS that results from file transfers. The user may determine that no degradation of video QoS is acceptable. While the invention has been described primarily with reference to an ATM environment, this is not critical. Alternative transmission environments may be utilized.

We claim:

1. A method of integrating a user-initiated data transfer with a continuous video transmission in a multimedia communication session comprising steps of:

enabling a party of said session to pre-select at least two levels of video quality of service for said session, including a first level pre-selected for time segments between said user-initiated data transfers and including a second level, that is lower than said first level, for time segments during said data transfers in anticipation of bandwidth congestion, thereby enabling said party to determine degradation of video quality of service during said time segments of said user-initiated data transfers;

negotiating connectivity for said session such that said first level of video quality of service is established;

switching video transmission requirements of said session in response to commencement of a first user-initiated data transfer, including basing said video transmission requirements upon said pre-selected second level of video quality of service; and restoring said first level of video quality of service upon completion of said first user-initiated data transfer.

2. The method of claim 1 further comprising repeating said steps of switching video transmission requirements and restoring said first level upon each commencement and each completion of a user-initiated data transfer during said session.

3. The method of claim 1 further comprising steps of monitoring video quality of service during said time segments of said data transfers and controlling transmissions for said data transfers in response to detecting that said monitored video quality of service is below a threshold quality set by said video transmission requirements.

4. The method of claim 3 wherein said step of monitoring video quality of service includes measuring the bit rate of video transmissions, said step of controlling transmissions for said data transfers including interrupting said data transfers in response to detecting that said bit rate is below a threshold rate.

5. The method of claim 4 wherein said step that includes interrupting said data transfers further includes transmitting an interrupt message to a sending site of said multimedia communications session and transmitting a restore data transmission message to said sending site in response to detecting that said bit rate is above said threshold.

6. The method of claim 1 further comprising a step of transmitting one of a document image, an audio clip and a still image as a user-initiated data transfer.

7. The method of claim 6 wherein said step of transmitting includes integrating said user-initiated data transfer with video data of a multimedia telecommunications call.

8. The method of claim 1 wherein said step of negotiating connectivity includes establishing connections for a videoconference session.

9. A method of integrating occasional data transmissions into real-time videoconference transmissions comprising steps of:

pre-selecting a desired video quality of service (QoS) level for said videoconference transmissions;

pre-selecting a reduced video QoS level for said videoconference transmissions during time segments of said occasional data transmissions in anticipation of bandwidth congestion, said reduced video QoS level being degraded relative to said desired video QoS, wherein pre-selection of said reduced video QoS establishes a threshold bit rate for real-time video transfers;

monitoring bit rates of said real-time video transfers during said time segments of said occasional data transmissions; and controlling execution of said occasional data transmissions based upon maintaining at least said reduced video QoS during said time segments of occasional data transmissions, including adaptively adjusting durations of said occasional data transmissions such that maintaining the bit rate of real-time video transfers at least as great as said threshold bit rate is accommodated.

10. The method of claim 9 further comprising a step of exchanging said videoconference transmissions and said occasional data transmissions along a single telecommunications channel.

11. The method of claim 10 wherein said step of exchanging said videoconference and occasional data transmissions along a single telecommunications channel includes forming and transmitting data packets.

12. The method of claim 11 wherein said step of controlling execution includes sending messages to suspend data transmissions when said bit rate of real-time video transfers is below said threshold bit rate, said step of controlling execution further including messages to restart data transmissions when said bit rate increases to a rate above said threshold bit rate.

13. The method of claim 11 wherein said step of controlling execution includes reallocating access to said single telecommunications channel based upon maintaining said bit rate of real-time video transfers, said reallocation being a reduction of transmitting data packets for said occasional data transfers when said bit rate decreases below said threshold bit rate.

14. A multimedia communications system comprising:

video means for forming real-time video data for transmission to a remote site;

display means for receiving real-time video data from said remote site;

file transfer means for exchanging data files upon initiation by a user;

means for enabling said user to pre-select a first level of video QoS for exchange of video data when said file transfer means is inactive and for enabling said user to pre-select a second level of video QoS for exchange of video data before said file transfer means is temporarily activated, said first level of video QoS being higher than said second level of video QoS;

means for monitoring QoS of said exchange of video data between said remote site and said video and display means during said file transfer; and regulating means, responsive to said means for monitoring, for controlling rates of exchanges by said file transfer means such that said second level of video QoS is automatically implemented and maintained when said file transfer means is active, said regulating means being connected to be inactive when said file transfer means is inactive.

15. The system of claim 14 wherein said video means and display means are components of a teleconference system connected to said remote site via telecommunications lines.

16. The system of claim 15 wherein said video, display and file transfer means are connected to transmit and receive data packets along a single telecommunications channel.

17. The system of claim 14 wherein said means for monitoring QoS is a device connected to determine bit rate of exchanges of said video data.

* * * * *